United States Patent [19]
McKinven, Jr.

[11] 3,767,063
[45] Oct. 23, 1973

[54] APPARATUS FOR REMOVING PARTS FROM MOLDING CAVITIES

[75] Inventor: Robert McKinven, Jr., Detroit, Mich.

[73] Assignee: Chicago Rawhide Manufacturing Co., Chicago, Ill.

[22] Filed: June 23, 1971

[21] Appl. No.: 155,844

[52] U.S. Cl............ 214/1 BB, 294/110, 294/DIG. 2
[51] Int. Cl............................................. B66c 1/62
[58] Field of Search.............................. 214/1 BB; 294/DIG. 2, 110

[56] References Cited
UNITED STATES PATENTS

| | | | |
|---|---|---|---|
| 3,013,835 | 12/1961 | Blatt | 214/1 BZ X |
| 3,061,116 | 10/1962 | Runge | 214/1 BB |
| 2,714,324 | 8/1955 | Dinsmore | 214/1 BB X |
| 2,873,995 | 2/1959 | Turner | 294/110 R X |
| 3,388,942 | 6/1968 | Johnsson | 294/110 R X |
| 2,347,922 | 5/1944 | Nelson | 294/DIG. 2 |
| 2,658,236 | 11/1953 | Altenpohl | 294/110 R X |

Primary Examiner—Gerald M. Forlenza
Assistant Examiner—George F. Abraham
Attorney—James T. Fitzgibbon

[57] ABSTRACT

An apparatus for removing plural piece parts received in and formed by parts of a separable mold unit. The apparatus typically is adapted to remove two parts simultaneously and includes a pair of fixtures adapted to removably receive the part for removal from the mold, the fixtures being mounted for movement from a remote position to a position adjacent the mold interior and thence into a position of registry with the part to be removed, following which the sequence is repeated in reverse order and the parts are released as the fixture is returned to the remote position. In a typical form, the element includes a stationary frame or chassis unit, a slide guide, a reciprocable slide unit having a pair of arms pivotally mounted on a portion thereof and means for moving the arms about their pivot points, causing movement of the fixture generally perpendicular to the axis of the slide movement. Preferably the fixtures are mounted on the ends of the arms and the fixtures may be removed and replaced with other fixtures for removal of different sizes and shapes of piece parts. A typical fixture includes plural latches urged into a closed position for holding the part to be removed and for preventing movement thereof in any direction, and further includes release means actuable by a portion of the chassis for releasing the part for removal from the fixture.

4 Claims, 9 Drawing Figures

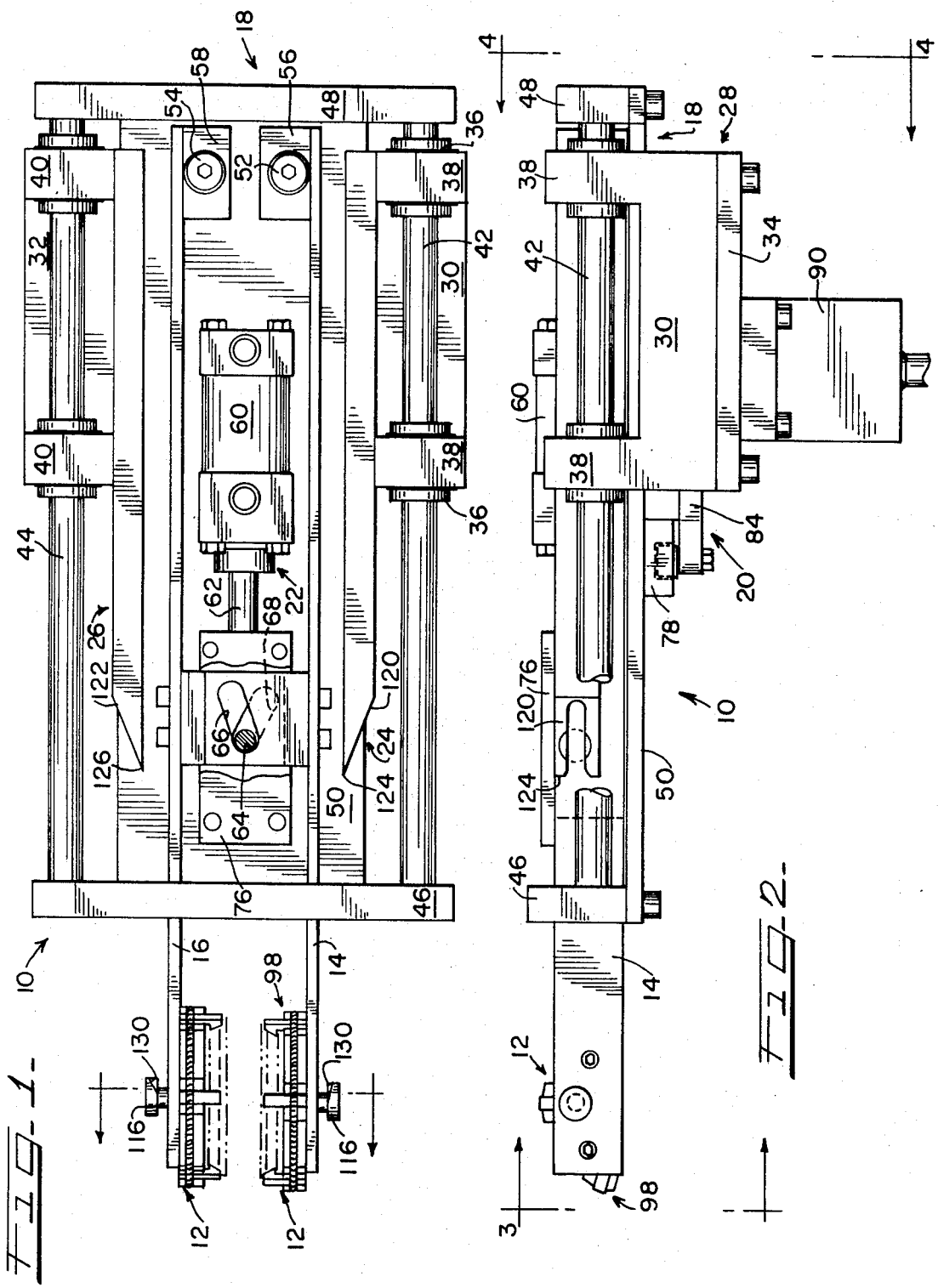

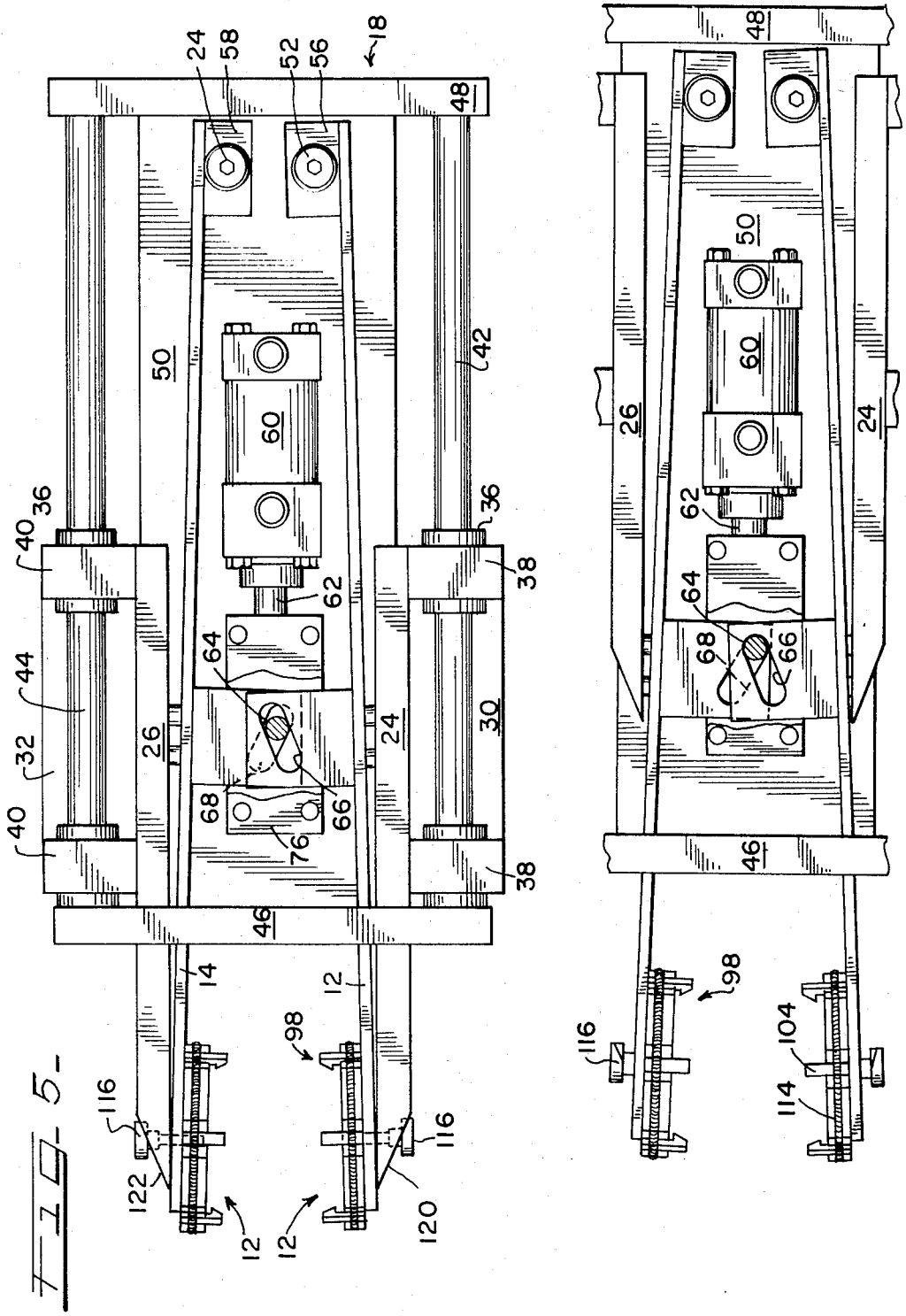

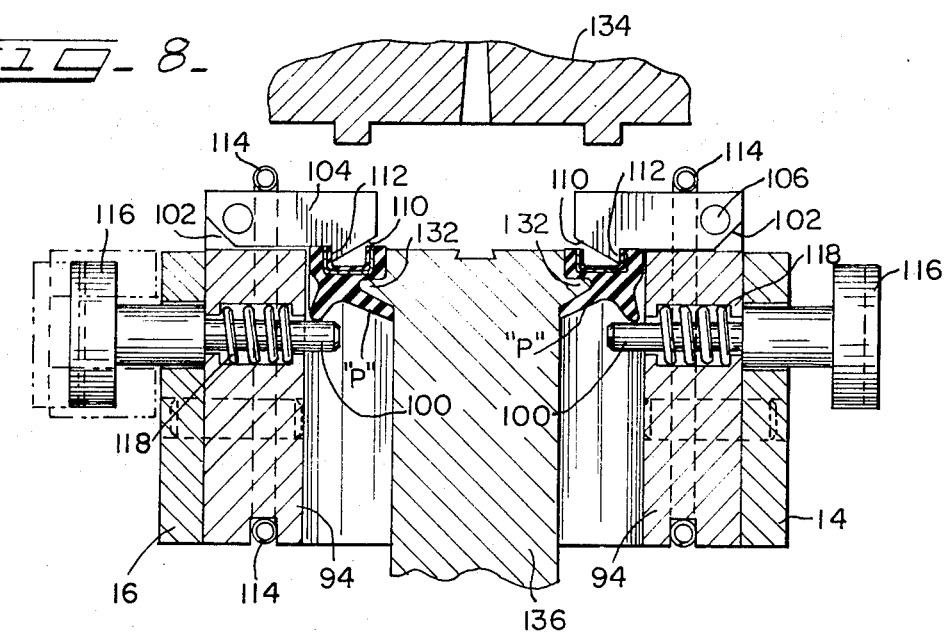
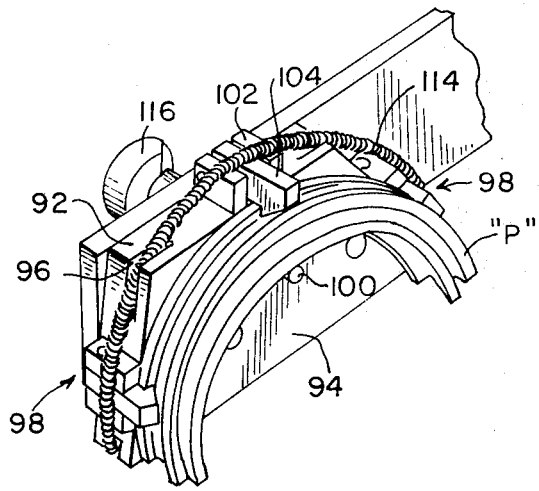
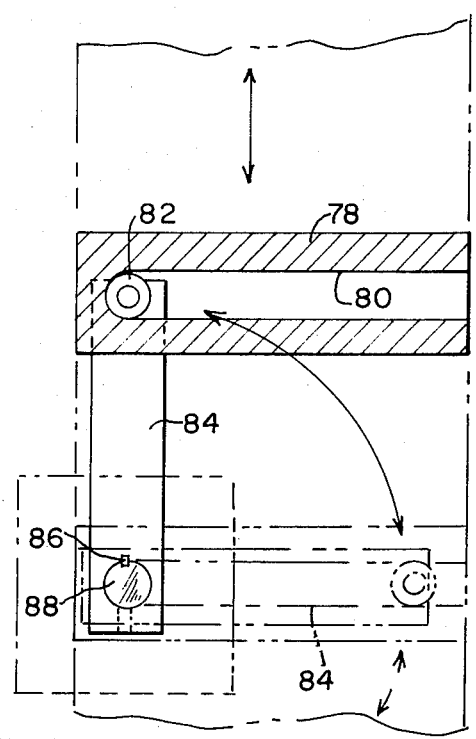

3,767,063

APPARATUS FOR REMOVING PARTS FROM MOLDING CAVITIES

BACKGROUND OF THE INVENTION

The present invention relates to an apparatus for removing finished piece parts or other elements from molds or the like, and more particularly, to an apparatus containing one or more fixtures especially adapted to be moved from a remote position into otherwise inaccessible areas of an openable multi-part mold to engage and support parts formed therein for removal to the remote position at which the parts are released from the fixture.

Although capable of other uses, the invention is advantageously embodied in a unit adapted to remove just-formed segmented oil seal piece parts or elements from a multi-part, openable injection mold. Such molds have not heretofore been commonly used in the molding of elastomers and thermosetting resins, although increasing use of such molds is now being made for these purposes. In the past, molded composite products such as oil seals having a metal stamping or like supporting member and a flexible elastomeric lip have been formed by the use of multi-cavity compression or transfer molds. Ordinarily, after molding, the pieces are removed, as by an air blast, knock out pin, or the like, to a collection area from which they may be advantageously transferred for finishing operations such as trimming or the like, or for packaging, for example.

Since compression or transfer molds of the types referred to above have not always proved fully advantageous for making certain products, particularly highly precise products, or products which may be produced in relatively low volume, the oil seal industry has recently taken considerable interest in injection molding. In many respects, injection molding is advantageous, particularly in cases where only a few individual or two cavity molds need be made and whereby the cost of making multi-cavity molds may be avoided. In some cases, more careful control of quality may be achieved by the use of a smaller number of molds. However, it is known that removal of pieces from an injection mold, which commonly comprises multiple mold parts opening along one or more axes, is difficult because direct access to the interior of the mold is not always available, and the inherent design of the mold often prevents removal of the parts along a single axis only.

Accordingly, most effective utilization of the improved techniques of injection molding sometimes depends on the capacity of the manufacturing apparatus to remove already molded parts in a simple and effective manner. In other words, part removal must not present obstacles tending to slow down the molding operation. Furthermore, the parts must be removed in a manner which is rapid and positive, and yet which does not tend to damage the part, particularly where the part is molded to precise tolerances.

Thus, there has been a requirement for a rapid, versatile, and economical unit for removing previously stripped parts from a portion of the mold with which they are associated after opening thereof, whereby the most advantageous use may be made of injection molding techniques.

Accordingly, an object of the present invention is to provide an improved apparatus for removing molded parts from an opened mold.

Another object is to provide an apparatus having means for engaging a finished, molded part, means for removing it therefrom along a predetermined axis, means for withdrawing the finished part along another axis to a remote position, and means for releasing the finished part from the apparatus in such remote position.

Another object is to provide an apparatus for such purpose which is fluid actuated and substantially self-contained.

Another object is to provide an apparatus capable of reciprocable movement in one direction and capable of movement for part pick up in another direction, and adapted to receive removable and replaceable fixtures so that different sizes of generally congruently shaped piece parts may be picked up and removed without change in the operating characteristics of the apparatus.

Another object is to provide an apparatus including one or more arms adapted to move from a remote position to a position adjacent the interior of the mold cavity, along a first path or axis, thereafter to move to a position of registry with the piece part, to releasably engage the part and to release the part following return of the arms to the remote position.

Another object is to provide an apparatus capable of receiving plural part-receiving fixtures, each adapted to engage a piece part for removal.

A further object is to provide a novel fixture unit for use in association with a part removal apparatus, and in particular, a fixture having a plurality of spring loaded latches and a movable release mechanism, adapted to engage a part upon being moved into contact therewith and to release the part in a predetermined direction following actuation of the release mechanism.

These and other objects of the invention are achieved by providing an apparatus having means for movement from a retracted position into an area adjacent the portion of a mold in which a piece part is received, means for moving a fixture supported on such means into engagement with the part, means for withdrawing the part therefrom and for removing the part along the first axis of movement, and means for releasing the part from the part-receiving fixture in said position.

The manner in which the invention accomplishes these objects, and other inherent objects and advantages thereof, will become more apparent when reference is made to the following detailed description of the preferred embodiments of the invention and to the accompanying drawings, wherein like reference numerals indicate corresponding parts throughout.

BRIEF DESCRIPTION OF THE DRAWINGS

FIG. 1 is a top plan view of the article removing apparatus of the present invention;

FIG. 2 is a side elevational view of the apparatus of FIG. 2, shown with portions broken away;

FIG. 5 is a top plan view of the apparatus of the invention, showing the fixture-receiving arms in a relatively open position and the stripper units engaging the article releasing mechanism;

FIG. 6 is a top plan view of the apparatus of FIGS. 1–5, showing the fixture-receiving arms in a fully open position of use;

FIG. 7 is a sectional view, with portions broken away, taken along lines 7—7 of FIG. 4 and showing the rotary slide actuator of the apparatus;

FIG. 8 is a greatly enlarged vertical sectional view through the fixtures of the apparatus, taken along lines 8—8 of FIG. 1 and showing fragmentary portions of an associated article forming mold;

FIG. 9 is a perspective view of one of the article receiving fixtures, showing a seal unit received therein after removal from the mold and prior to release thereof from the fixture.

DESCRIPTION OF THE PREFERRED EMBODIMENTS OF THE INVENTION

Figure 4:
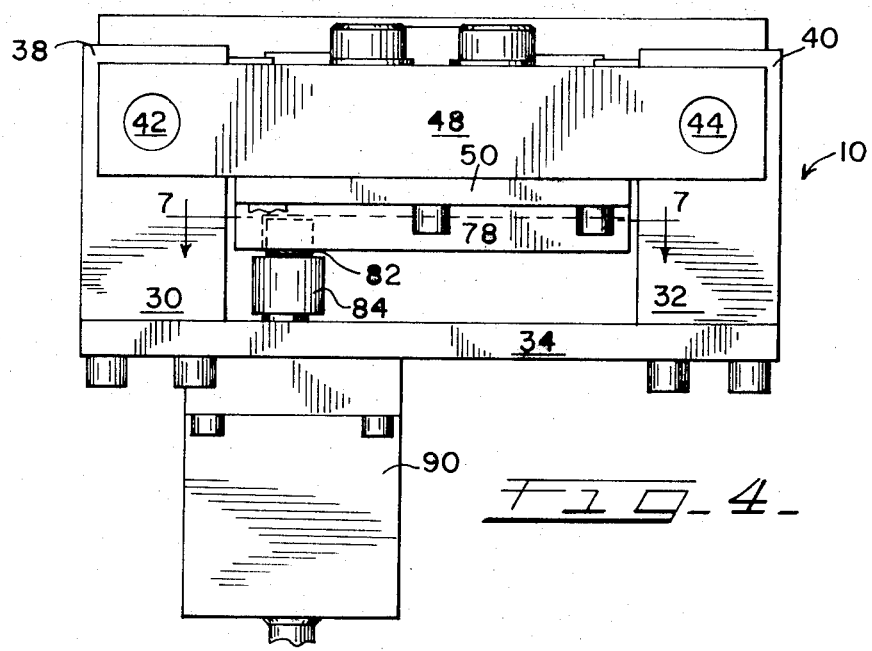
FIG. 4 is an elevational view of the opposite end of the apparatus, taken along lines 4—4 of FIG. 2.

Although the invention is capable of being used for other purposes and in other environments, the principles thereof will be illustrated by description of a preferred embodiment wherein segmented oil seals are the articles to be removed from the molding cavity, and wherein the cavity is constructed and arranged so as, in the open position thereof, to require movement in two directions or along two axes for part removal. Likewise, the illustrated embodiment includes means for removing two parts from a two-cavity mold, although it will be apparent that from one up to any reasonable number of removal elements or fixtures might be provided in a single structure.

Referring now to the drawings in greater detail, FIG. 1 shows an article removing apparatus embodying the invention and generally designated 10 to comprise a number of major elements, namely, a pair of article receiving fixtures 12, a pair of arm assemblies 14, 16 supporting the fixtures 12, a reciprocable slide unit 18, a slide actuator assembly 20, an arm spreading mechanism 22, a pair of stripper bars 24, 26, and a stationary chassis unit 28. The chassis unit 28 includes a pair of bushing support units 30, 32 and a chassis base plate 34 extending therebetween. Bushing elements 36 are received within longitudinally aligned openings extending through the raised end portions 38, 40 of the bushing supports 30, 32.

The reciprocable slide unit 18 is arranged to reciprocate longitudinally relative to the chassis 28 and includes guide means in the form of a pair of rods 42, 44 extending between front and rear chassis end plates 46, 48 is a slide unit base plate 50. Accordingly, it may be seen that the slide unit 18, and parts carried thereby, may be made to move longitudinally, that is, to the left and right as shown in FIGS. 1 and 2, as the rods 42, 44 slide within the bushings 36. The slide unit 18 further includes, at the rear thereof, a pair of cylindrical posts 52, 54 extending through circular openings formed in a pair of pivot blocks 56, 58 which attached respectively to the rear ends of the arms 14, 16. FIG. 1 also shows that an arm spreading apparatus 22 is provided and that this apparatus 22 is mounted on the slide element base plate 50. The apparatus 22 also includes a double acting cylinder and piston assembly 60 having a rod 62 extending from one end thereof terminating in a fixedly attached pin 64 received within a pair of inclined slots 66, 68 formed within cam plates 70, 72 held by fasteners 74 to an intermediate portion of the arms 14, 16. A cover plate 76 normally overlies the pin 64 and the cam plates 70, 72 and therefore, the cover plate 76 is shown broken away for clarity of illustration. Accordingly, referring to FIGS. 1, 5, and 6, for example, it may be noted that longitudinal movement of the pin 64 brings about lateral movement of the intermediate portions of the arms 14, 16. Since the arms 14, 16 are pivotally mounted by blocks 56, 58, the forward end portions of the arms 14, 16 are moved respectively farther apart and closer together as the pin 64 is driven backward and forward by the rod 62. Additional reference will be made elsewhere herein to this feature.

Figure 3:
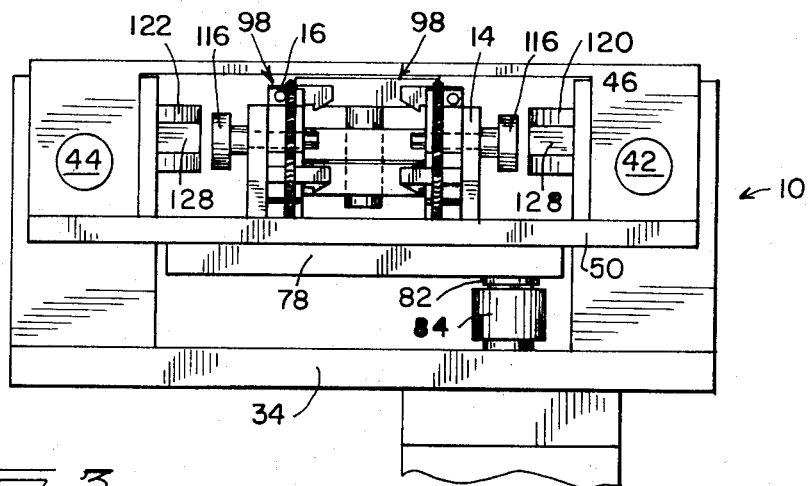
FIG. 3 is an end elevational view of the apparatus of FIG. 2, taken along lines 3—3 of FIG. 2 and showing the end of the apparatus containing the part removal fixtures.

Referring now to FIGS. 2, 3, 4 and 7, it will be noted that the slide 18 also includes, fastened to the lower surface of the slide element base plate 50, a transverse cam plate 78 having a milled slot 80 therein for reception of a roller 82 affixed to one end of a torque arm 84 which serves as the slide driver. The arm 84 is fixedly fastened, as by a key 86, to a drive shaft 88 extending upwardly from a power unit 90 disposed beneath the chassis base plate 34. The power unit 90 is a so-called rotary actuator of a well known type adapted to oscillate the shaft 88 through a 180° arc. FIG. 7 shows the drive or torque arm 84 in its forwardly extending position in solid lines, and shows it in an intermediate or 90° position in phantom lines, it being understood that the arm 84 is capable of moving through the entire 180° arc, consequently providing for the plate 78 and parts associated therewith travel a distance equal to twice the distance between the center lines of the shaft 88 and the roller 82. Although it is apparent that other drive systems might be used, the illustrated form is advantageous in that it provides maximum mechanical advantage at the extreme ends of the stroke with maximum speed in the middle part thereof, with the consequence that slide movement starts and stops slowly, reducing inertial loads, noise, etc., as well as providing slow movement into the area of registry with the seals of other molded parts.

Referring now to the fixtures 12 disposed on the ends of the arms 14, 16, in the illustrated embodiment these fixtures are adapted to receive and retain piece parts P which, in this case, are so-called half seals or segmented seals of the type illustrated in prospective in FIG. 9 and in section in FIG. 8. The illustrated form of fixture includes a body portion 92 having an inwardly directed face 94, a plurality of slots 96 extending parallel to the face 94, three latching assemblies 98, and a spring loaded release pin 100. As shown, each latching assembly 98 includes a pair of mounting ears 102, and a pivotable claw 104 mounted on a shaft 106 extending between the ears 102. The nose portion 108 of each claw 104 is provided with an inclined camming surface 110 and a barb 112. The claws 104 are urged into a closed or article-holding position closely overlying an adjacent portion of the body 92 by a garter spring 114 extending around the body 92 and received within the slots 96.

Accordingly, the claws 104 are normally urged into a position such as that shown in FIGS. 8 and 9, although they may and will in fact be raised when first engaging the part to be removed from the mold. It will also be noted that the release pin 100 includes an enlarged head portion 116 and a spring 118 biasing it to the article holding solid line position of FIG. 8. Accordingly, it will be appreciated that, assuming an arm 16 and its associated fixture 12 to be moving toward the position of FIG. 8, the nose portion of the release pin 100 will be moved into a position just beneath the part P, while the claws 108 surround the upper and side edges of the part P and prevent it from being removed axially of the direction of approach of the fixture. Accordingly, when the fixture 12 is positioned as shown, the piece P is held against movement in any direction. However, only the nose portion of the part 100 prevents the part P from falling downwardly and out of the fixture. Therefore, moving the pin 100 outwardly or to the phantom line position of FIG. 8 will result in downward release of the part. For this purpose, and referring now for example to FIGS. 1, 5, and 6, it will be noted that the stripper bars 24, 26 which are fixed to the end portions 38, 40 of the bushing supports 30, 32 have tapered camming surfaces 120, 122 thereon with the surfaces 120, 122 terminating in relatively sharp forward edges 124, 126. As shown in FIG. 2, the inclined surface portions 120, 122 of the stripper bars 24, 26 include longitudinally extending, milled slots 128. Furthermore, the enlarged knob 116 on the outer end of each of the release pins 100 includes a complementary inclined surface 130. Accordingly, referring to FIG. 5, for example, with the forward end portions of the arm assemblies 14, 16 in their laterally outward position, and with the slide 18 in the rearmost position relative to the chassis 28, the tapered surfaces 120, 122 bear against the heads 116 of the pins 110 and withdraw them against the spring force, permitting the articles or parts held by the release pin to drop freely from the fixture, in a preoriented relation.

Referring now to the operation of the entire unit 10 of the invention, it will be assumed that a piece part P (FIG. 8) is supported upon a pair of semi-circular bosses 130, 132, and that an upper portion 134 of a separable mold is spaced apart from the center or core portion 136 thereof. Thus, the part is held against falling and may in fact customarily be additionally retained in place by the presence of so-called tear trim portions or other residual pieces or rubber or the like held by portions of the mold core 136.

Accordingly, with a piece in such position with the opened mold, it will be assumed that the apparatus is in the position shown in FIG. 5, that is, with the slide unit 18 in the withdrawn position and the arms 14, 16 being somewhat or completely spaced apart. Accordingly, from the position of FIG. 5, the rod 62 is withdrawn to the rear or to the right as shown in FIG. 5. Next, with the arms 14, 16 being spread apart to the position shown in FIG. 6, the slide 18 and associated parts are advanced forwardly as shown in FIG. 6. In this way, the slide 18 may be moved so as to position the fixtures 12 opposite the seals or other parts intended to be removed from the mold. Thereupon, the piston and cylinder assembly 60 is actuated, pushing the pin 64 to the front to move the free ends of the arms 14, 16 and the fixtures 12 carried thereon to a more closely spaced apart position such as that shown in FIG. 1.

At this time, the camming surfaces 110 on the claws 104 ride up over the edges of the part P until the barbs 112 engage the channels formed on the radially outer surfaces of the part P. Simultaneously, the release pin 100 is moved to a position immediately beneath the part P. Thereupon, the cylinder and piston assembly 60 is actuated again in a direction opposite to that of its previous movement, whereby moving the fixtures 12 to the spread apart position shown in FIG. 6. Next, the power unit 90 is actuated, causing the torque arm 84 to swing through a 180° arc to its rearmost position, thereby removing the slide 18 and its associated parts from the mold and to a remote or withdrawn position. At or near the end of this stroke, in a predetermined position, the inclined surface portions 120, 122 of the stripper bars 24, 26 engage the heads 116 of the release pins 100, pulling them outwardly and permitting the parts to drop from the fixtures 12.

An incidental feature of this method of removal and release is that the parts are maintained in a predetermined orientation; accordingly, if this is desired for reasons such as checking or subsequent positioning of the part, a further advantage is presented. After operating through the above described cycle, the unit is inherently ready to perform identical repeated cycles and accordingly the apparatus may remove pieces on signals emanating from the control unit of an associated press unit or the like.

Referring again to FIGS. 5 and 6, it should be understood that, for purposes of illustration, FIG. 6 shows the slide 19 in an advanced position with the arms in the farthest spread apart position; FIG. 5 shows the slide in its farthest removed or withdrawn position, and with the arms in an intermediate position; while FIG. 1 shows the arms in their closest spaced apart position with the slide also being in the most forward position. As pointed out, it is customary to spread the arms, insert them into the cavity, move them together into a position of registry with the part to be removed, spread them again and then withdraw the fixture by longitudinal movement, leaving the arms in the spaced or spread apart position until the edges 124, 126 of the stripper bars 24, 26 become operative; however, this operational sequence is only a preferred sequence and not necessary to practice of the invention.

Although no particular mode of operation is required to carry the invention into practice, good results have been obtained using pneumatic or electrical forces for the power supply 90 and pneumatic forces for the arm spreading mechanism or apparatus 22. In such a case, conventional, well known solenoid operated valves operate an air supply in a manner not forming a part of the invention which is necessarily novel per se which is well known to those skilled in the art. Therefore, description of such elements is omitted.

Referring now to the part-receiving fixtures 12, a construction thereof has been shown wherein three latching assemblies 98 are provided and where a garter spring 114 surrounds them to urge them into a position lying along an arc of a circle the same size as the outside diameter as the part. However, other forms of springs are equally applicable, and it is apparent to those skilled in the art that different latching mechanisms may be provided. Furthermore, it is also apparent that the position of the latching elements will depend on the size and shape of the article to be removed, while the location of the release pin or the provision of one or more of such units may determine the manner in which the parts are removed from the fixture.

It will thus be seen that the present invention provides a new and improved apparatus for removing parts from molds or the like and that such apparatus has a number of advantages and characteristics, including those pointed out herein and others which are inherent in the invention.

I claim:

1. An apparatus for removing articles from a mold in which said articles are formed, said apparatus comprising, in combination, a relatively fixed chassis member, a slide unit reciprocable relative to said chassis unit, means on said chassis unit for receiving a slide guide, longitudinally extending guide means forming a portion of said slide unit, a pair of fixture support arms pivotally attached to said slide unit, means disposed on said slide unit for moving at least the end portions of said arms closer to and farther away from each other, fixtures received on said ends of each of said arms opposite the portions of said arms pivotally attached to said slide, each of said fixtures including means thereon for receiving a part therein, including a plate for engaging one surface of said article, article-engaging claws fixed relative to said plate and arranged for pivotal movement into and out of engagement w1h said article, resilient means normally urging said jaws to an article-engaging position, release means for supporting the lower surface of said article, and means associated with said chassis for actuating said release means in a predetermined position of said slide unit with respect to said chassis.

2. An apparatus as defined in claim 1 wherein said means for moving said end portions of said arms closer and farther from each other is in the form of a double acting cylinder unit having camming means thereon, and wherein said arms include cooperating means for said cams to produce movement of said arms laterally of said slide upon longitudinal movement of said cam means.

3. An apparatus as defined in claim 1 wherein said slide means has associated therewith means for reciprocating said slide, said means including an arcuately movable arm having one end thereof associated with a yoke disposed on said slide.

4. An apparatus as defined in claim 1 wherein said claws are arranged about the upper, forward, and rearward peripheries of said article, and wherein said resilient means comprises a common spring engaging outer surfaces of all of said claws.

* * * * *